Figure 1:
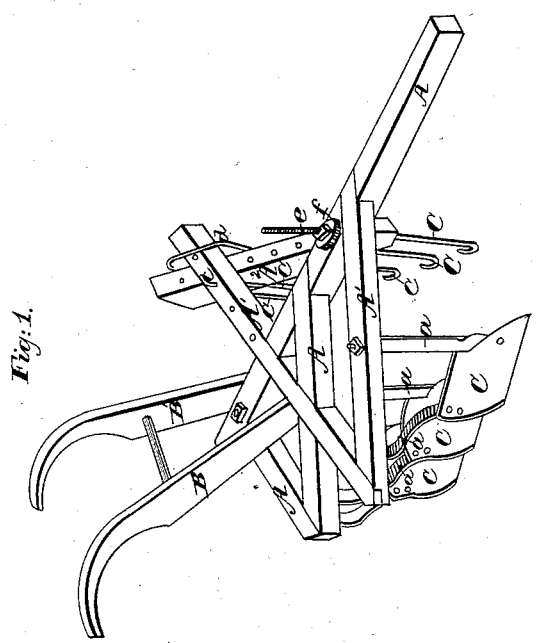

W. PRICE.
Cultivator.

No. {396, 31,400.}    Patented Feb. 12, 1861.

Witnesses:

UNITED STATES PATENT OFFICE.

WHITMAN PRICE, OF MOUNT OLIVE, NORTH CAROLINA.

IMPROVEMENT IN CULTIVATORS.

Specification forming part of Letters Patent No. 31,400, dated February 12, 1861.

*To all whom it may concern:*

Be it known that I, WHITMAN PRICE, of Mount Olive, in the county of Wayne and State of North Carolina, have invented a new and Improved Cultivator with Adjustable Rake; and I do hereby declare that the following is a full and exact description thereof.

The nature of my invention consists in the arrangement of devices hereinafter described.

To enable others skilled in the art to make and use my invention, I will proceed to describe its construction and operation.

In the construction of my invention, A represents the beam and side frames; A', the cross-frames; B and B', the handles; C, the shovels; $a$, the braces attaching the shovels to beam A; $b$, the rake; $c$, pin for adjusting the sweep of the rake; $d$, the yoke attaching the rake to cross-frames A'; $e$, screw for adjusting the depth of the rake; $f$, screw-nut and adjustable washer.

In the operation of my invention I set my shovels as described, thus forming a gang-plow. The rake operates on the land side and serves as a guide to the plow.

The rake can be adjusted by means of pin $e$ and yoke $d$, sliding on cross-bar A'. It can be adjusted vertically, by means of screw $e$ and nut and washer $f$, by placing the washer below the beam, between it and head of the rake.

Owing to the construction and arrangement of my standards $a$, to which the shovels C are attached, they mutually strengthen and support each other.

My shovels are made of sheet metal without being subjected to a welding heat, and are simply bolted or riveted to standards $a$.

The shovels can be adjusted vertically by means of screws through frames A and A'.

Having thus described the nature of my invention, what I claim as my invention, and desire to secure by Letters Patent, is—

The arrangement of the beam A, side frames, A', handles B and B', shovels C, standards $a$, rake-head $A^a$ and teeth B, pin $c$, and yoke $d$, the whole being constructed, combined, and operating as and for the purpose set forth.

WHITMAN PRICE.

Witnesses:
T. N. GRIFFIN,
JENNINGS PIGOTT.